United States Patent [19]

Bhatnagar et al.

[11] Patent Number: 4,869,730
[45] Date of Patent: Sep. 26, 1989

[54] ENDOTHERMIC GAS GENERATOR

[75] Inventors: Madhu Bhatnagar, Canton; Ronald E. Opfer, Jr., Milford, both of Mich.

[73] Assignee: Holcroft/Loftus, Inc., Livonia, Mich.

[21] Appl. No.: 200,007

[22] Filed: May 27, 1988

[51] Int. Cl.$^4$ ............................................. B01J 12/00
[52] U.S. Cl. ................................. 48/196 R; 48/196 A; 48/DIG. 10; 422/111; 422/112
[58] Field of Search ............... 422/111, 112, 113; 48/191, 196 R, 196 A, 61, DIG. 10

[56] References Cited

U.S. PATENT DOCUMENTS

| | | | |
|---|---|---|---|
| 2,085,584 | 6/1937 | Haskell | 422/111 |
| 2,550,126 | 4/1951 | Snow | 422/111 |
| 3,479,166 | 11/1969 | Hirt | 48/196 A |
| 3,644,099 | 2/1972 | Crans | 422/189 |
| 4,048,091 | 9/1977 | Barnaba | 252/373 |
| 4,355,003 | 10/1982 | Grobel | 422/206 |
| 4,549,886 | 10/1985 | Stevenson | 48/197 R |
| 4,676,805 | 6/1987 | Richter et al. | 48/197 R |

Primary Examiner—Joye Woodard
Attorney, Agent, or Firm—Fish & Richardson

[57] ABSTRACT

An improved gas generator in which the composition of gas generated in a heated reactor is maintained when the flow rate from the reactor is adjusted. To accomplish this, the generator includes two diverting means responsive to the flow rate. The first diverts a portion of the reactant mixture before it enters the reactor, the diverted amount being insufficient to change the composition of the generated gas. The second diverts a portion of the generated gas to a burner for heating the reactor.

3 Claims, 1 Drawing Sheet

4,869,730

ENDOTHERMIC GAS GENERATOR

BACKGROUND OF THE INVENTION

This invention relates to generating gas atmospheres.

Endothermic gas atmospheres (i.e. atmospheres prepared using the addition of heat) are typically prepared in an endothermic gas generator (e.g., a class AGA 302 generator) by reacting a rich mixture of air and combustible hydrocarbon gas inside an externally heated reactor (called a retort) in the presence of a catalyst, e.g., nickel. These atmospheres are useful as furnace atmospheres for the performance of various metallurgical processes, e.g., carburizing, carbonitriding, and clean hardening. The composition of the atmosphere affects the performance of the metallurgical process. Thus, it is important to maintain the predetermined composition of the endothermic gas atmosphere throughout production.

SUMMARY OF THE INVENTION

In general, the invention features an improved gas generator that includes a heated reactor in which a mixture of air and combustible gas is reacted to produce a gas atmosphere having a predetermined composition, the improvement being the inclusion of apparatus for maintaining the composition of the gas atmosphere generated by the reactor when the flow rate from the reactor is adjusted. The apparatus includes:

- a first diverting means responsive to the flow rate for diverting a variable portion of the air-combustible gas mixture before it is introduced into the reactor, the quantity of the diverted mixture being insufficient to substantially change the composition of the gas atmosphere; and
- a second diverting means responsive to the flow rate for diverting a variable portion of the gas atmosphere to a burner to serve as a heating source for the reactor,
- the first and second diverting means being arranged to prevent the composition of the gas atmosphere from changing substantially when the flow rate from the reactor is adjusted. A substantial change in composition is one which makes the atmosphere unsuitable for its intended use.

In preferred embodiments, the first diverting means includes an impulse line responsive to a change in the flow rate from the reactor and a regulator activatable by a signal from the impulse line that causes a portion of the air-combustible gas mixture to bypass the reactor as needed. Preferably, the first diverting means is capable of diverting no more than 30% of the mixture. The second diveting means preferably includes a first regulator responsive to a change in the flow rate from the reactor for diverting a portion of the gas atmosphere to the burner for heating the reactor, and a second regulator responsive to the flow of the diverted gas atmosphere for supplying the proper amount of air to the burner for flow of the gas.

In other preferred embodiments, the first and second diverting means also cooperate to prevent the dew point of the output gas atmosphere from changing substantially (as defined above) when the output rate of the reactor is adjusted.

The invention also features a process for producing a gas atmosphere while preventing its composition from changing substantially when the flow rate of the gas atmosphere from the generator is adjusted.

The invention provides a way of preparing gas atmospheres simply, efficiently, and economically. The ability to adjust the output rate of the generator without substantially affecting the gas composition makes it possible for the generator to supply more than one furnace at a time and to adjust the supply to various furnaces as necessary. Furthermore, this ability saves energy because the generator can be turned down to low-flow when the furnace is idling or not cycling and then turned up again with no adverse effect. Moreover, instead of being vented and burned (thus requiring additional energy), the excess gas output is recycled and used to supply energy in the form of heat to the reactor where the gas is produced.

Other features and advantages of the invention will be apparent from the following description of the preferred embodiments thereof and from the claims.

BRIEF DESCRIPTION OF THE DRAWING

The FIGURE is a schematic view of an endothermic gas generator embodying the invention.

DETAILED DESCRIPTION OF THE PREFERRED EMBODIMENTS

Figure 1:
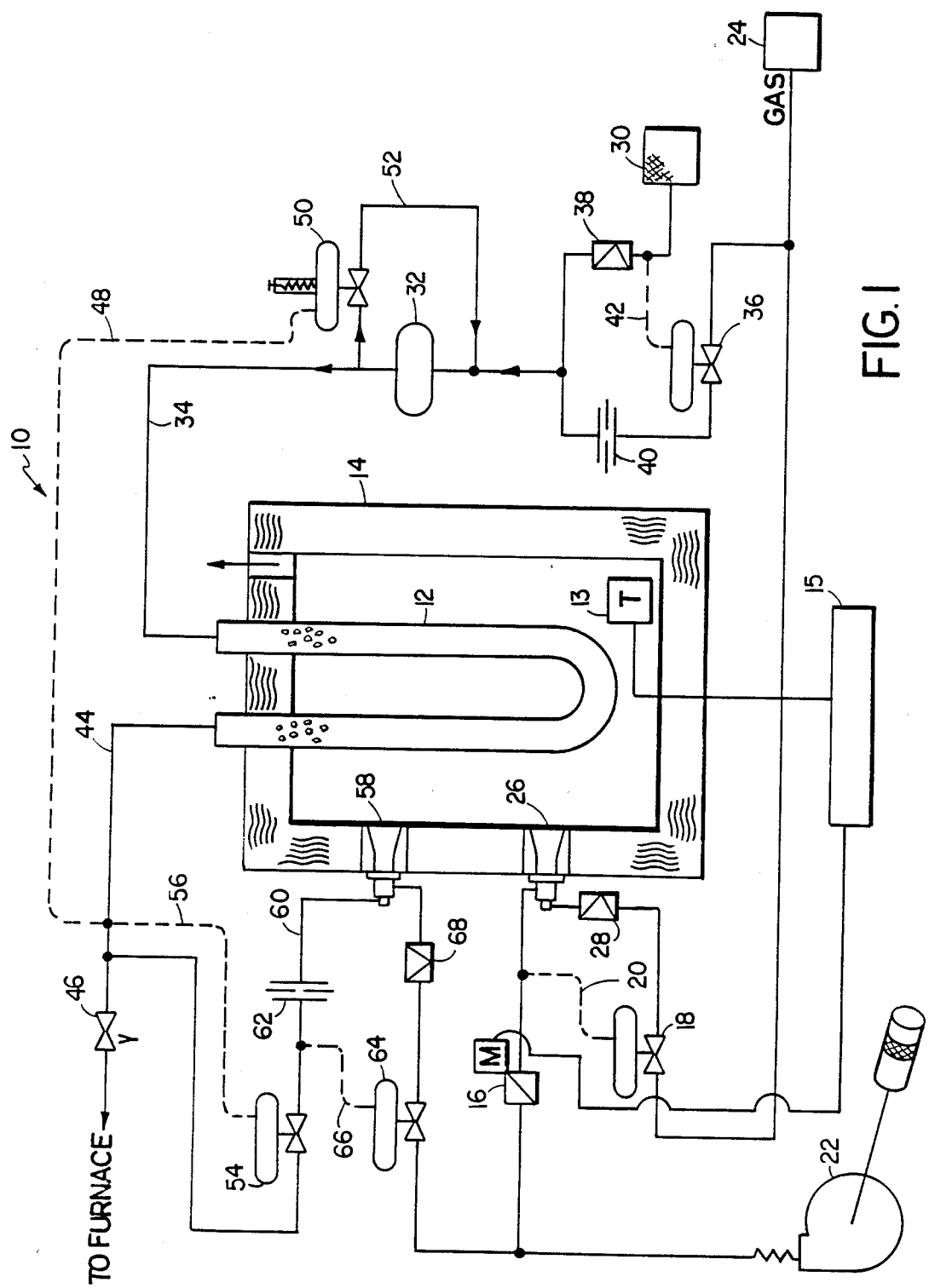

Referring to the FIGURE, gas generator 10 includes a retort 12 containing catalyst (typically nickel or a nickel alloy) in which air and hydrocarbon gas are catalytically reacted to yield the desired endothermic gas atmosphere. Retort 12 is surrounded by a heat-insulating casing 14. A thermocouple 13 records the temperature in casing 14 and sends the recorded temperature value to a temperature controller 15. If the recorded temperature is less than the desired temperature, temperature controller 15 sends a signal to valve 16, telling it to open and initiate high fire conditions for heating casing 14.

When valve 16 opens, it causes regulator 18 to open via a signal sent through impulse line 20. With valve 16 and regulator 18 open, air from blower 22 and combustible hydrocarbon gas from a gas source 24 are fed to nozzle mix burner 26, where the mixture is combusted to heat casing 14. Regulator 18 regulates the air/gas mixture to maintain the proper air/gas ratio for combustion. Orifice 28 is used to manually adjust the air/gas ratio before the mixture is fed to burner 26.

When the desired temperature in casing 14 (as determined by thermocouple 13) is reached, temperature controller 15 signals valve 16 to close; this, in turn, causes regulator 18 to close as well. With valve 16 and regulator 18 closed down to a minimum flow condition, burner 26 fires at a pre-set minimum input and generator 10 resumes low fire conditions.

To prepare the combustible air/gas reactant mixture used to generate the endothermic gas atmosphere, hydrocarbon gas from gas source 24 and atmospheric air drawn through filter 30 are drawn into pump 32. Pump 32 mixes the air and gas, compresses it to a higher pressure, and then passes it to retort 12 through line 34 for catalytic combustion. Regulator 36, orifice 38, and orifice 40 are designed to achieve the proper air/gas ratio (as dictated by the desired composition of the endothermic gas product) before the mixture reaches pump 32. Orifice 38 regulates the pressure of air drawn through filter 30. Regulator 36 senses the air pressure through filter 30 through a signal sent via impulse line 42 and adjusts the gas inflow pressure proportionally. Orifice 40 further adjusts the gas flow.

The air/gas mixture input to retort 12 (maintained at a constant reaction temperature) is catalytically reacted to form the product gas atmosphere. This atmosphere passes from retort 12 through a water-cooled heat exchanger (not shown) to cool it and then to a furnace (not shown) via line 44 for use in the desired metallurgical process.

Valve 46 controls thee flow of endothermic gas from retort 12 to the furnace; a valve at the furnace can also be used for this purpose. When it is desired to turn down generator 10, valve 46 is throttled, thereby progressively increasing the pressure in line 44. The increased pressure activates impulse line 48 which signals normally closed regulator 50 to open. Once opened, regulator 50 diverts up to approximately 30% of the air/combustible gas mixture from pump 32 as needed through a shunt created by regulator 50, pump 32, and line 52. A physical stop limits the bypass to 30%. Limiting the bypass to approximately 30% is preferred because it maintains the composition of the product gas while at the same time being energy-efficient. The remaining 70% of the mixture passes through line 34 and into retort 12 for reaction.

Further throttling of valve 46 after 30% of the air/combustible gas mixture has been diverted further increases the pressure in line 44, signaling regulator 54, through impulse line 56, to open. This diverts the flow of endothermic gas to nozzle mix burner 58 via gas flow line 60. Orifice 62 helps regulate the incoming gas pressure.

The endothermic gas flowing through line 60 signals regulator 64 (via impulse line 66) to open, thereby providing a matching supply of air from blower 22 to burner 58 for combustion. Orifice 68 helps regulate the air pressure to achieve the proper air/gas ratio for combustion. Burner 58 is then used to heat casing 14, permitting burner 26 to assume low fire conditions.

Operation

The preparation of an endothermic gas atmosphere composed of approximately 20% CO, 40% $H_2$, and 40% $N_2$ follows.

Retort 12 was filled with nickel catalyst and casing 14 brought to 1850° F. by firing burner 26 using a combustible mixture of methane gas from gas source 24 and air from blower 22 (air to gas ratio maintained at 10:1 for proper combustion). Once the reaction temperature was reached, casing 14 was maintained at this temperature by selectively firing burner 26 as described above.

The reactant air/gas mixture for producing the endothermic gas atmosphere was prepared by setting regulator 36, orifice 38, and orifice 40 to allow approximately 1 cubic foot of methane (from gas source 24) for every 2.5 cubic feet of air drawn through filter 30 to be drawn into pump 32, this particular gas to air ratio being chosen because it yields the desired endothermic gas atmosphere composition. After being compressed to higher pressure, the reactant mixture entered retort 12 where it was catalytically reacted. The $CO/CO_2$ content of the product atmosphere leaving retort 12 was analyzed using an ANARAD gas analyzer and found to contain 0.18$CO_2$ and 20.4CO with valve 46 set to provide a flow of 2500 cubic feet per hour (cfh) to the furnace. The dewpoint was also measured and found to be 34° F. The flow rate from retort 12 was then progressively turned down by throttling valve 46 at 20 to 30 minute intervals from the initial 2500 cfh to 0 cfh (complete turn down). During turn down, the air/gas mixture was diverted from pump 32 and circulated around the shunt formed by regulator 50, pump 32, and line 52 up to the point where 30% of the mixture had been diverted. Once this point had been reached, further turn down caused the excess endothermic gas produced in retort 12 to be diverted to burner 58 for heating casing 14.

The $CO/CO_2$ composition and dew point for the product gas after each flow adjustment were measured and are set forth in Table 1. As the figures indicate, adjustment in the flow rate caused very little change in either the gas composition or dew point.

TABLE 1

| Time  | Flow (cfh) | $CO_2$ | CO   | Dewpoint (°F.) |
|-------|------------|--------|------|----------------|
| 12:30 | 2500       | .18    | 20.6 | 34             |
| 1:00  | 2250       | .17    | 20.5 | 35             |
| 1:20  | 2000       | .17    | 20.5 | 35             |
| 1:45  | 1500       | .16    | 20.3 | 34             |
| 2:10  | 1000       | .16    | 20.7 | 34             |
| 2:45  | 500        | .17    | 21.4 | 34             |
| 3:45  | 0          | .17    | 21.6 | 34             |
| 3:47* | 500        | .18    | 21.8 | 33–34          |
| 3:49* | 1500       | .16    | 21.3 | 34             |

*These changes were made at rapid intervals to simulate a furnace high-low flow condition.

Other embodiments are within the following claims. We claim:

1. In a gas generator that includes a reactor externally heated by a burner in which a mixture of air and combustible gas is reacted to produce a gas atmosphere having a predetermined composition, inlet means for introducing the mixture of air and combustible gas into said reactor, and outlet means for transporting the gas atmosphere from said reactor, said outlet means having a valve for adjusting the flow rate of the gas atmosphere from said reactor, the improvement wherein said generator further includes apparatus for maintaining the predetermined composition of the gas atmosphere generated by said reactor when the flow rate from said reactor is adjusted comprising a first diverting means interconnected with said inlet and outlet means for diverting no more than about 30% of the mixture of air and combustible gas before it is introduced into said reactor in response to the adjustment in flow rate from said reactor, and a second diverting means interconnected with said outlet means for diverting a variable portion of the gas atmosphere to a second burner to serve as a second external heating means for said reactor in response to the adjustment in flow rate from said reactor.

2. The generator of claim 1 wherein said first diverting means comprises an impulse line responsive to an adjustment in the flow rate from aid reactor and a regulator activatable by a signal from said impulse line that diverts up to about 30% of the mixture of air and combustible gas from said reactor.

3. The generator of claim 1 wherein said second diverting means comprises a first regulator responsive to an adjustment in the flow rate from said reactor for diverting the variable portion of the gas atmosphere to said second burner and a second regulator responsive to the flow of the diverted gas atmosphere for supplying the proper amount of air to said second burner for combustion of the diverted gas atmosphere.

* * * * *